(12) United States Patent
Ngo et al.

(10) Patent No.: US 11,409,677 B2
(45) Date of Patent: Aug. 9, 2022

(54) BUS SLAVE CIRCUIT AND RELATED SINGLE-WIRE BUS APPARATUS

(71) Applicant: Qorvo US, Inc., Greensboro, NC (US)

(72) Inventors: Christopher Truong Ngo, Queen Creek, AZ (US); Alexander Wayne Hietala, Phoenix, AZ (US)

(73) Assignee: QORVO US, INC., Greensboro, NC (US)

( * ) Notice: Subject to any disclaimer, the term of this patent is extended or adjusted under 35 U.S.C. 154(b) by 0 days.

(21) Appl. No.: 17/095,204

(22) Filed: Nov. 11, 2020

(65) Prior Publication Data

US 2022/0147474 A1    May 12, 2022

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
None
See application file for complete search history.

(56) References Cited

U.S. PATENT DOCUMENTS

| | | |
|---|---|---|
| 3,555,196 A | 1/1971 | Singer |
| 3,953,835 A | 4/1976 | Cuccio et al. |
| 4,336,447 A | 6/1982 | Oguchi et al. |
| 4,424,812 A | 1/1984 | Lesnick |
| 4,497,068 A | 1/1985 | Fischer |
| 4,736,367 A | 4/1988 | Wroblewski et al. |
| 5,412,644 A | 5/1995 | Herberle |
| 5,459,660 A | 10/1995 | Berra |
| 5,495,469 A | 2/1996 | Halter et al. |
| 5,499,247 A | 3/1996 | Matsuda et al. |
| 5,586,266 A | 12/1996 | Hershey et al. |
| 5,621,897 A | 4/1997 | Boury et al. |
| 5,684,803 A | 11/1997 | Nguyen Thuy |
| 5,734,847 A | 3/1998 | Garbus et al. |
| 5,748,675 A | 5/1998 | Hormel et al. |
| 5,774,680 A | 6/1998 | Wanner et al. |
| 5,787,132 A | 7/1998 | Kishigami et al. |

(Continued)

OTHER PUBLICATIONS

Final Office Action for U.S. Appl. No. 16/736,164, dated Jan. 11, 2021, 10 pages.

(Continued)

*Primary Examiner* — Elias Mamo
(74) *Attorney, Agent, or Firm* — Withrow & Terranova, P.L.L.C.

(57) ABSTRACT

A single-wire bus apparatus that includes a bus slave circuit(s) is provided. The bus slave circuit(s) can receive a unicast, a multicast, and/or a broadcast command sequence over a single-wire bus. In embodiments disclosed herein, the bus slave circuit(s) can be configured to determine whether to respond to a received multicast or broadcast command sequence based on a predefined response policy. As such, the single-wire bus apparatus can be configured to mix and match a legacy slave circuit(s), which always responds to the received multicast or broadcast command sequence, with an enhanced slave circuit(s) that can decide whether to respond to the received multicast or broadcast command sequence based on the predefined response policy. As a result, it is possible to improve design and implementation flexibility, such as supporting more bus slave circuits per port.

19 Claims, 6 Drawing Sheets

(56) References Cited

U.S. PATENT DOCUMENTS

| | | | |
|---|---|---|---|
| 5,832,207 | A | 11/1998 | Little et al. |
| 5,978,860 | A | 11/1999 | Chan et al. |
| 6,094,699 | A | 7/2000 | Surugucchi et al. |
| 6,141,708 | A | 10/2000 | Tavallaei et al. |
| 6,189,063 | B1 | 2/2001 | Rekeita et al. |
| 6,292,705 | B1 | 9/2001 | Wang et al. |
| 6,308,255 | B1 | 10/2001 | Gorishek, IV et al. |
| 6,310,408 | B1 | 10/2001 | Hermann |
| 6,360,291 | B1 | 3/2002 | Tavallaei |
| 6,397,279 | B1 | 5/2002 | Jaramillo et al. |
| 6,408,163 | B1 | 6/2002 | Fik |
| 6,484,268 | B2 | 11/2002 | Tamura et al. |
| 6,985,990 | B2* | 1/2006 | Bronson ............ G06F 13/4027 |
| | | | 710/10 |
| 7,197,589 | B1 | 3/2007 | Deneroff et al. |
| 7,519,005 | B2 | 4/2009 | Hejdeman et al. |
| 7,685,320 | B1 | 3/2010 | Wishneusky |
| 7,729,427 | B2 | 6/2010 | Kwok |
| 8,509,318 | B2 | 8/2013 | Tailliet |
| 8,694,710 | B2 | 4/2014 | Bas et al. |
| 8,775,707 | B2 | 7/2014 | Poulsen |
| 9,166,584 | B1 | 10/2015 | Kandala et al. |
| 9,252,900 | B2 | 2/2016 | Poulsen |
| 9,430,321 | B2 | 8/2016 | Slik |
| 9,519,612 | B2 | 12/2016 | Hietala et al. |
| 9,569,386 | B2 | 2/2017 | Du |
| 9,639,500 | B2 | 5/2017 | Bas et al. |
| 9,652,451 | B2 | 5/2017 | Elder |
| 9,690,725 | B2 | 6/2017 | Sengoku |
| 9,755,821 | B2 | 9/2017 | Jang et al. |
| 9,946,677 | B2 | 4/2018 | Hapke |
| 10,176,130 | B2 | 1/2019 | Ngo et al. |
| 10,185,683 | B2 | 1/2019 | Ngo et al. |
| 10,558,607 | B2 | 2/2020 | Ngo et al. |
| 10,599,601 | B1 | 3/2020 | Ngo et al. |
| 2001/0050713 | A1 | 12/2001 | Kubo et al. |
| 2004/0049619 | A1 | 3/2004 | Lin |
| 2004/0100400 | A1 | 5/2004 | Perelman et al. |
| 2004/0128594 | A1 | 7/2004 | Elmhurst et al. |
| 2004/0221067 | A1 | 11/2004 | Huang et al. |
| 2005/0012492 | A1 | 1/2005 | Mihalka |
| 2005/0185665 | A1 | 8/2005 | Uboldi |
| 2005/0259609 | A1* | 11/2005 | Hansquine ............ H04L 12/403 |
| | | | 370/328 |
| 2006/0031618 | A1 | 2/2006 | Hansquine et al. |
| 2006/0050694 | A1 | 3/2006 | Bury et al. |
| 2006/0152236 | A1 | 7/2006 | Kim |
| 2006/0236008 | A1 | 10/2006 | Asano et al. |
| 2007/0073449 | A1 | 3/2007 | Kraemer et al. |
| 2008/0217076 | A1 | 9/2008 | Kraemer et al. |
| 2009/0121825 | A1 | 5/2009 | Har |
| 2009/0248932 | A1 | 10/2009 | Taylor et al. |
| 2010/0305723 | A1 | 12/2010 | Koyama |
| 2010/0306430 | A1 | 12/2010 | Takahashi |
| 2011/0035632 | A1 | 2/2011 | Hong et al. |
| 2011/0113171 | A1 | 5/2011 | Radhakrishnan et al. |
| 2012/0027104 | A1* | 2/2012 | Bas .................... G06F 1/3287 |
| | | | 375/253 |
| 2012/0030753 | A1 | 2/2012 | Bas et al. |
| 2012/0226965 | A1 | 9/2012 | Hammerschmidt et al. |
| 2012/0303836 | A1 | 11/2012 | Ngo et al. |
| 2013/0054850 | A1 | 2/2013 | Co |
| 2013/0124763 | A1 | 5/2013 | Kessler |
| 2013/0128724 | A1 | 5/2013 | Farley et al. |
| 2013/0132624 | A1 | 5/2013 | Chen et al. |
| 2013/0166801 | A1 | 6/2013 | Chun et al. |
| 2013/0197920 | A1 | 8/2013 | Lesso et al. |
| 2013/0265884 | A1 | 10/2013 | Brombal et al. |
| 2013/0301689 | A1 | 11/2013 | Marchand et al. |
| 2014/0025999 | A1 | 1/2014 | Kessler |
| 2014/0112339 | A1 | 4/2014 | Safranek et al. |
| 2014/0281593 | A1 | 9/2014 | Hayes |
| 2014/0304442 | A1 | 10/2014 | Hietala et al. |
| 2014/0310436 | A1 | 10/2014 | Du |
| 2014/0376278 | A1 | 12/2014 | Fornage et al. |
| 2015/0056941 | A1 | 2/2015 | Lin et al. |
| 2015/0074306 | A1* | 3/2015 | Ayyagari ............ G06F 13/4072 |
| | | | 710/110 |
| 2015/0106541 | A1 | 4/2015 | Southcombe et al. |
| 2015/0127862 | A1 | 5/2015 | Fan et al. |
| 2015/0149673 | A1 | 5/2015 | Balkan et al. |
| 2015/0169482 | A1 | 6/2015 | Ngo et al. |
| 2015/0192974 | A1 | 7/2015 | Ngo et al. |
| 2015/0193297 | A1* | 7/2015 | Ngo .................... G06F 11/0745 |
| | | | 714/758 |
| 2015/0193298 | A1* | 7/2015 | Ngo .................... G06F 13/3625 |
| | | | 714/758 |
| 2015/0193321 | A1 | 7/2015 | Ngo et al. |
| 2015/0193373 | A1 | 7/2015 | Ngo et al. |
| 2016/0050513 | A1 | 2/2016 | Wang et al. |
| 2016/0124892 | A1 | 5/2016 | Amarilio et al. |
| 2017/0255250 | A1 | 9/2017 | Ngo et al. |
| 2017/0255578 | A1 | 9/2017 | Ngo et al. |
| 2017/0255579 | A1 | 9/2017 | Ngo et al. |
| 2017/0277651 | A1* | 9/2017 | Ngo .................... G06F 13/364 |
| 2017/0286340 | A1 | 10/2017 | Ngo et al. |
| 2018/0217959 | A1 | 8/2018 | Ngo et al. |
| 2019/0250876 | A1* | 8/2019 | Amarilio ............. G06F 3/162 |
| 2020/0151131 | A1 | 5/2020 | Ngo et al. |
| 2020/0334185 | A1 | 10/2020 | Ngo et al. |
| 2020/0394046 | A1 | 12/2020 | Snelgrove et al. |

OTHER PUBLICATIONS

International Search Report and Written Opinion for International Patent Application No. PCT/US2020/012702, dated Apr. 7, 2020, 17 pages.

Non-Final Office Action for U.S. Appl. No. 16/599,384, dated Aug. 24, 2020, 8 pages.

Final Office Action for U.S. Appl. No. 16/599,384, dated Dec. 1, 2020, 9 pages.

Non-Final Office Action for U.S. Appl. No. 16/549,116, dated Aug. 6, 2020, 9 pages.

Final Office Action for U.S. Appl. No. 16/549,116, dated Jan. 13, 2021, 9 pages.

Non-Final Office Action for U.S. Appl. No. 16/710,457, dated Aug. 28, 2020, 7 pages.

Notice of Allowance for U.S. Appl. No. 16/736,164, dated Apr. 29, 2021, 8 pages.

Non-Final Office Action and Examiner-Initiated Interview Summary for U.S. Appl. No. 16/549,116, dated May 12, 2021, 10 pages.

Advisory Action for U.S. Appl. No. 16/736,164, dated Mar. 19, 2021, 3 pages.

Advisory Action for U.S. Appl. No. 16/549,116, dated Mar. 24, 2021, 3 pages.

Non-Final Office Action for U.S. Appl. No. 14/575,491, dated May 26, 2017, 20 pages.

Non-Final Office Action for U.S. Appl. No. 14/659,379, dated Apr. 7, 2017, 37 pages.

Author Unknown, "1-Wire," Wikipedia, last modified Jan. 16, 2015, accessed Feb. 12, 2015, http://en.wikipedia.org/wiki/1-Wire, 4 pages.

Author Unknown, "DS1822: Econo 1-Wire Digital Thermometer," Maxim Integrated, 2007, 21 pages.

Author Unknown, "MAXIM 1-Wire® Tutorial," MAXIM, online audiovisual presentation, 17 slides, No Date, accessed Feb. 12, 2015, http://www.maximintegrated.com/products/1-wire/flash/overview/ (38 images of slides).

Awtry, Dan, et al., "Design Guide v1.0," Springbok Digitronics, Aug. 19, 2004, 96 pages.

Non-Final Office Action for U.S. Appl. No. 14/575,491, dated Nov. 30, 2017, 18 pages.

Non-Final Office Action for U.S. Appl. No. 14/659,292, dated Sep. 29, 2017, 27 pages.

Final Office Action for U.S. Appl. No. 14/659,292, dated Apr. 30, 2018, 24 pages.

Non-Final Office Action for U.S. Appl. No. 14/659,328, dated Sep. 8, 2017, 51 pages.

Final Office Action for U.S. Appl. No. 14/659,328, dated Mar. 20, 2018, 61 pages.

(56) References Cited

OTHER PUBLICATIONS

Notice of Allowance for U.S. Appl. No. 14/659,328, dated Jul. 2, 2018, 8 pages.
Non-Final Office Action for U.S. Appl. No. 14/659,355, dated Sep. 20, 2017, 32 pages.
Final Office Action for U.S. Appl. No. 14/659,355, dated Apr. 17, 2018, 11 pages.
Advisory Action for U.S. Appl. No. 14/659,355, dated Jul. 5, 2018, 3 pages.
Non-Final Office Action for U.S. Appl. No. 15/467,790, dated Jun. 28, 2018, 14 pages.
Ex Parte Quayle Action for U.S. Appl. No. 15/365,315, dated Jul. 26, 2018, 7 pages.
Final Office Action for U.S. Appl. No. 14/659,379, dated Oct. 18, 2017, 44 pages.
Advisory Action for U.S. Appl. No. 14/659,379, dated Feb. 26, 2018, 3 pages.
Notice of Allowance for U.S. Appl. No. 14/659,379, dated Mar. 20, 2018, 10 pages.
Non-Final Office Action for U.S. Appl. No. 14/659,371, dated Sep. 25, 2017, 23 pages.
Final Office Action for U.S. Appl. No. 14/659,371, dated May 3, 2018, 21 pages.
Advisory Action for U.S. Appl. No. 14/659,371, dated Aug. 1, 2018, 3 pages.
Non-Final Office Action for U.S. Appl. No. 14/659,292, dated Dec. 21, 2018, 23 pages.
Final Office Action for U.S. Appl. No. 14/659,292, dated Jun. 4, 2019, 24 pages.
Non-Final Office Action for U.S. Appl. No. 14/659,355, dated Oct. 12, 2018, 8 pages.
Final Office Action for U.S. Appl. No. 14/659,355, dated May 2, 2019, 8 pages.
Non-Final Office Action for U.S. Appl. No. 15/886,209, dated May 17, 2019, 7 pages.
Non-Final Office Action for U.S. Appl. No. 14/659,371, dated Feb. 26, 2019, 22 pages.
Non-Final Office Action for U.S. Appl. No. 15/365,295, dated Mar. 29, 2019, 15 pages.
Final Office Action for U.S. Appl. No. 15/365,295, dated Aug. 15, 2019, 11 pages.
Final Office Action for U.S. Appl. No. 15/467,790, dated Nov. 5, 2018, 15 pages.
Advisory Action for U.S. Appl. No. 15/467,790, dated Feb. 26, 2019, 3 pages.
Notice of Allowance for U.S. Appl. No. 15/467,790, dated May 20, 2019, 8 pages.
Non-Final Office Action for U.S. Appl. No. 15/443,236, dated Nov. 16, 2018, 19 pages.
Final Office Action for U.S. Appl. No. 15/443,236, dated May 30, 2019, 20 pages.
Notice of Allowance and Examiner-Initiated Interview Summary for U.S. Appl. No. 15/365,315, dated Sep. 14, 2018, 9 pages.
Notice of Allowance for U.S. Appl. No. 15/472,756, dated Aug. 8, 2018, 8 pages.
Notice of Allowance for U.S. Appl. No. 15/886,209, dated Sep. 11, 2019, 7 pages.
Notice of Allowance for U.S. Appl. No. 16/402,613, dated Nov. 4, 2019, 9 pages.
Notice of Allowance for U.S. Appl. No. 16/407,397, dated Nov. 12, 2019, 7 pages.
Advisory Action for U.S. Appl. No. 15/365,295, dated Nov. 6, 2019, 3 pages.
Corrected Notice of Allowance for U.S. Appl. No. 15/467,790, dated Aug. 15, 2019, 6 pages.
Corrected Notice of Allowance for U.S. Appl. No. 15/467,790, dated Aug. 28, 2019, 6 pages.
Notice of Allowance for U.S. Appl. No. 15/443,236, dated Sep. 24, 2019, 8 pages.
Notice of Allowance for U.S. Appl. No. 15/365,295, dated Feb. 25, 2020, 8 pages.
Awtry, Dan, "Transmitting Data and Power over a One-Wire Bus," Sensors, Feb. 1997, Dallas Semiconductor, 4 pages.
Non-Final Office Action for U.S. Appl. No. 16/736,164, dated Feb. 27, 2020, 7 pages.
Final Office Action for U.S. Appl. No. 16/736,164, dated Jun. 2, 2020, 7 pages.
Non-Final Office Action for U.S. Appl. No. 16/736,164, dated Sep. 21, 2020, 8 pages.
Applicant-Initiated Interview Summary for U.S. Appl. No. 16/549,116, dated Aug. 18, 2021, 2 pages.
Notice of Allowance and Examiner-Initiated Interview Summary for U.S. Appl. No. 16/549,116, dated Sep. 14, 2021, 15 pages.
Non-Final Office Action for U.S. Appl. No. 17/102,510, dated Mar. 18, 2022, 12 pages.

\* cited by examiner

BUS SLAVE CIRCUIT AND RELATED SINGLE-WIRE BUS APPARATUS

FIELD OF THE DISCLOSURE

The technology of the disclosure relates generally to a single-wire communication bus in an electronic device.

BACKGROUND

Mobile communication devices have become increasingly common in current society. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as Wi-Fi, long-term evolution (LTE), and fifth-generation new-radio (5G-NR). To achieve the higher data rates in mobile communication devices, a mobile communication device may employ a power amplifier(s) to amplify a radio frequency (RF) signal(s) to a higher output power prior to radiating the RF signal via an antenna(s).

However, the increased output power of RF signal(s) can lead to increased power consumption and thermal dissipation, thus compromising overall performance and user experiences. Envelope tracking (ET) is a power management technology designed to improve efficiency levels of PAs to help reduce power consumption and thermal dissipation in mobile communication devices. As such, it may be desirable to enable ET in mobile communication devices whenever possible. Notably, the RF signal(s) communicated in different wireless communication systems may correspond to different modulation bandwidths (e.g., from 80 KHz to over 200 MHz). As such, it may be further desirable to ensure that the power amplifier(s) can maintain optimal efficiency across a wide range of modulation bandwidth.

In many mobile communication devices, the power amplifier(s) and the antenna(s) are typically located in an RF front-end (RFFE) circuit communicatively coupled to a transceiver circuit(s) via an RFFE bus as defined in the MIPI® alliance specification for radio frequency front-end control interface, version 2.1. However, not all communications require a two-wire serial bus like the RFFE bus. In some cases, a single-wire serial bus may be sufficient or even desired for carrying out certain type of communications between circuits. As such, it may be possible to provide a single-wire bus, either concurrent to or independent of, the RFFE bus in a mobile communication device.

SUMMARY

Aspects disclosed in the detailed description include a single-wire bus apparatus that includes a bus slave circuit(s). The bus slave circuit(s) can receive a unicast, a multicast, and/or a broadcast command sequence over a single-wire bus. In embodiments disclosed herein, the bus slave circuit(s) can be configured to determine whether to respond to a received multicast or broadcast command sequence based on a predefined response policy. As such, the single-wire bus apparatus can be configured to mix and match a legacy slave circuit(s), which always responds to the received multicast or broadcast command sequence, with an enhanced slave circuit(s) that can decide whether to respond to the received multicast or broadcast command sequence based on the predefined response policy. As a result, it is possible to improve design and implementation flexibility, such as supporting more bus slave circuits per port.

In one aspect, a bus slave circuit is provided. The bus slave circuit includes a slave port coupled to a single-wire bus. The bus slave circuit also includes a controller. The controller is configured to receive a command sequence via the slave port. The controller is also configured to determine whether to respond to the received command sequence based on a predefined response policy. The controller is also configured to assert an acknowledgement signal on the single-wire bus in response to determining to respond to the received command sequence.

In another aspect, a single-wire bus apparatus is provided. The single-wire bus apparatus includes a single-wire bus consisting of one wire. The single-wire bus apparatus also includes a number of bus slave circuits. Each of the number of bus slave circuits includes a slave port coupled to the single-wire bus. Each of the number of bus slave circuits also includes a controller. The controller is configured to receive a command sequence via the slave port. The controller is also configured to determine whether to respond to the received command sequence based on a predefined response policy. The controller is also configured to assert an acknowledgement signal on the single-wire bus in response to determining whether to respond to the received command sequence.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Aspects disclosed in the detailed description include a single-wire bus apparatus that includes a bus slave circuit(s). The bus slave circuit(s) can receive a unicast, a multicast, and/or a broadcast command sequence over a single-wire bus. In embodiments disclosed herein, the bus slave circuit(s) can be configured to determine whether to respond to a received multicast or broadcast command sequence based on a predefined response policy. As such, the single-wire bus apparatus can be configured to mix and match a legacy slave circuit(s), which always responds to the received multicast or broadcast command sequence, with an enhanced slave circuit(s) that can decide whether to respond to the received multicast or broadcast command sequence based on the predefined response policy. As a result, it is possible to improve design and implementation flexibility, such as supporting more bus slave circuits per port.

Figure 1A:
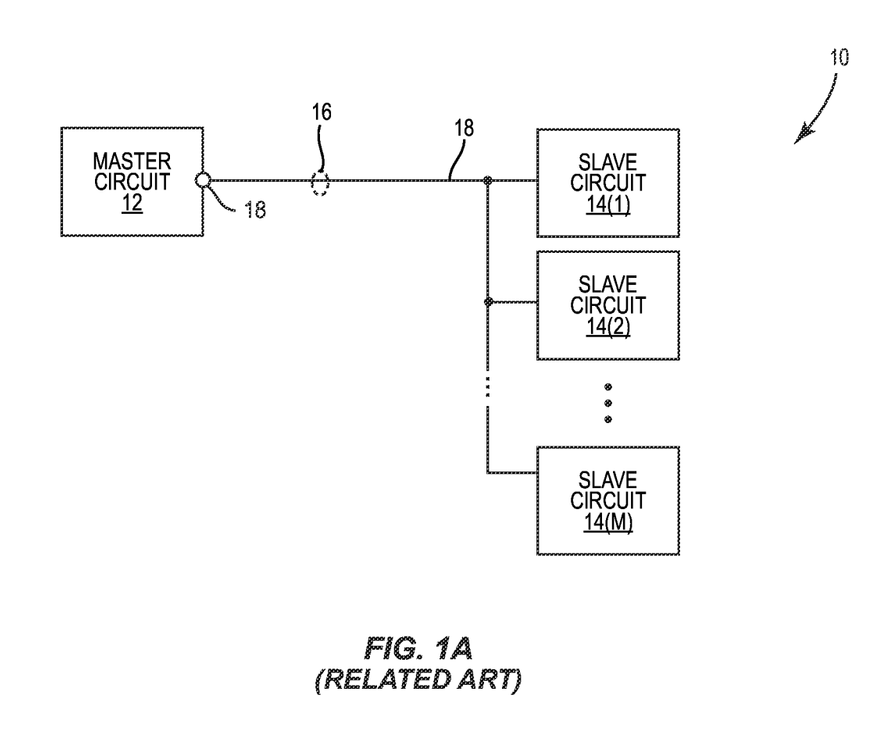
FIG. 1A is a schematic diagram of an exemplary conventional single-wire bus (SuBUS) apparatus in which a master circuit is configured to communicate with a slave circuit(s) over a SuBUS.
Figure 1B:
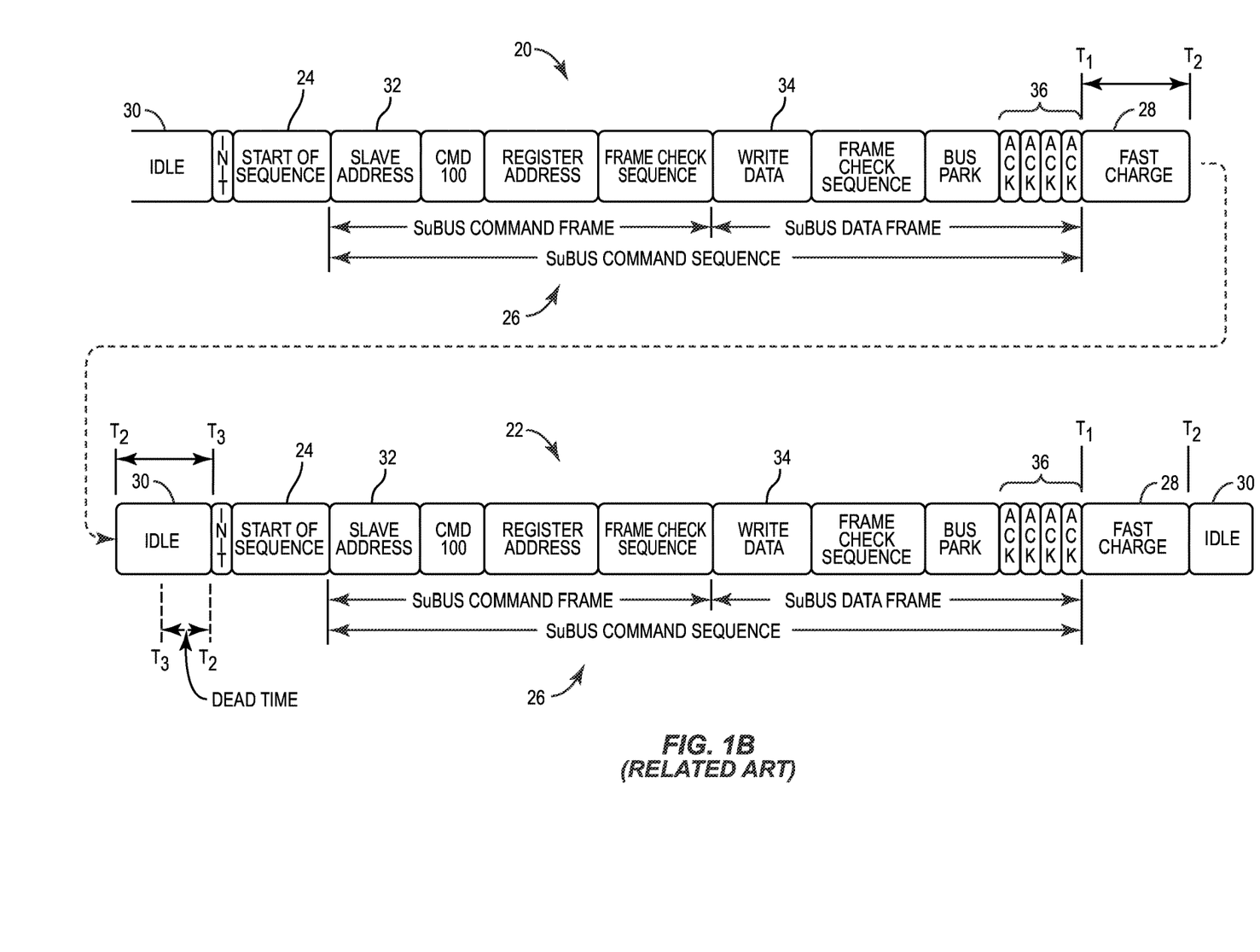
FIG. 1B is a schematic diagram providing an exemplary illustration of one or more SuBUS telegrams communicated over the SuBUS of FIG. 1A.
Figure 1C:
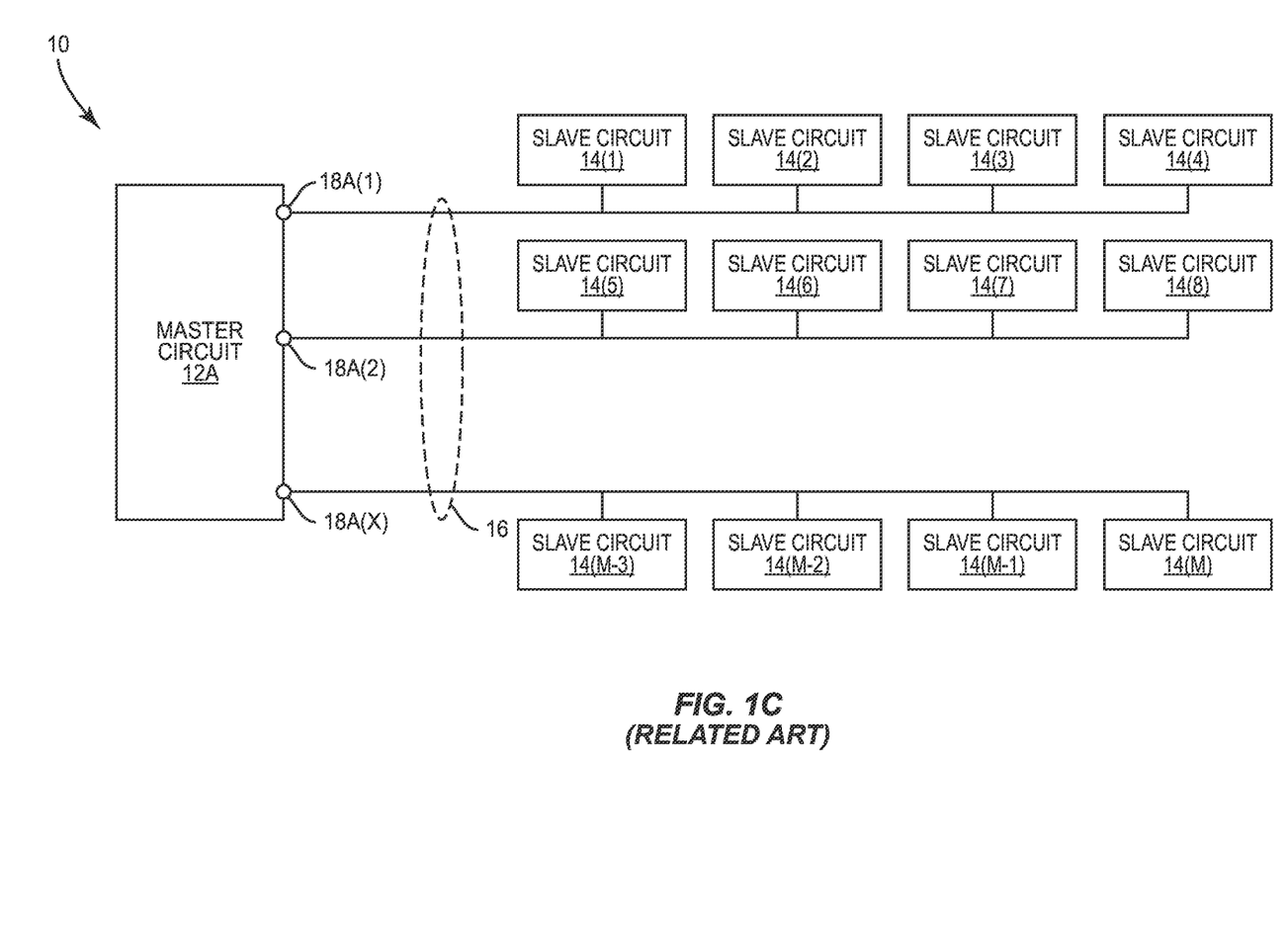
FIG. 1C is a schematic diagram of the conventional SuBUS apparatus of FIG. 1A adapted to include a multi-port master circuit for communicating with the slave circuit(s) over the SuBUS.
Figure 2:
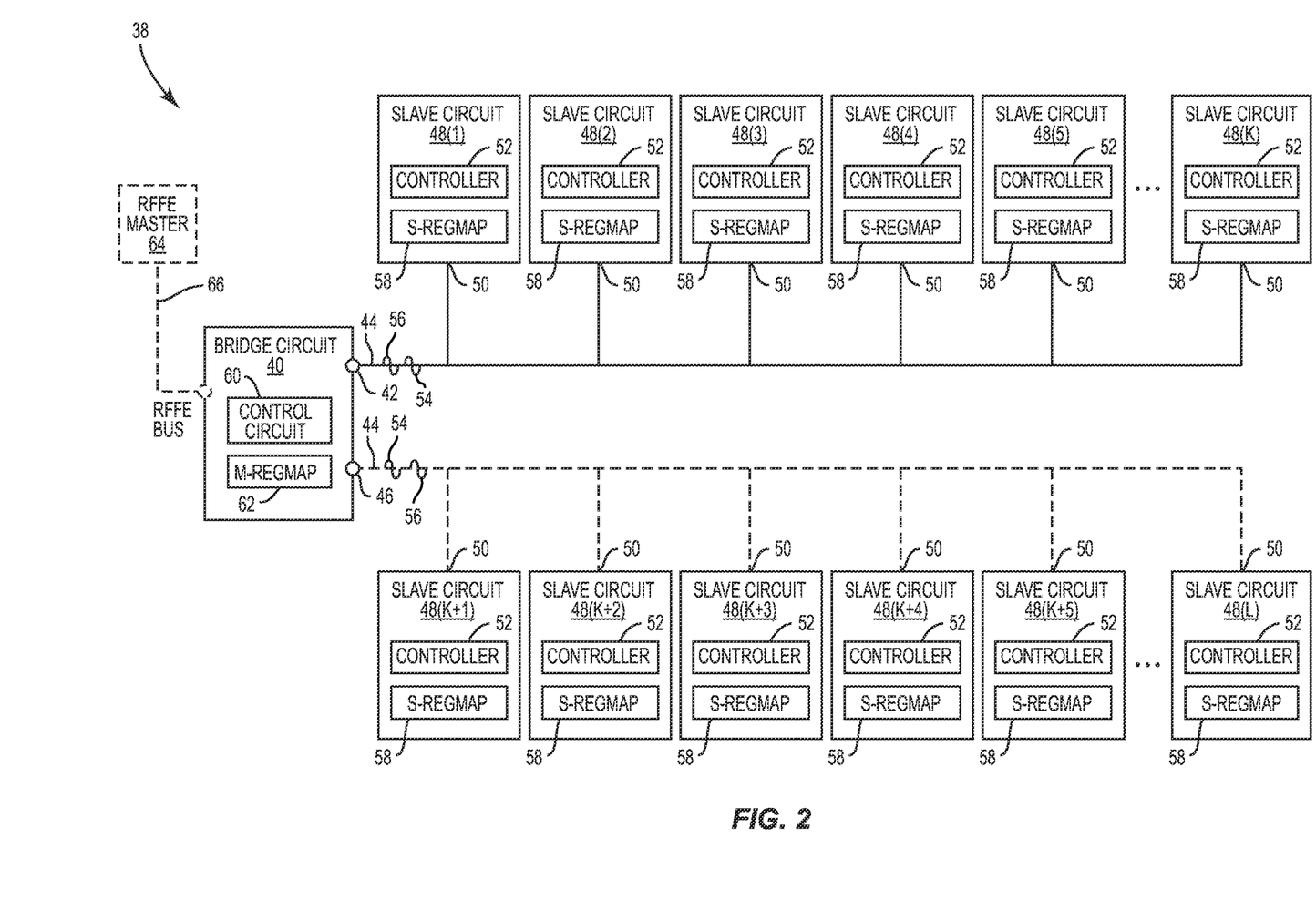
FIG. 2 is a schematic diagram of an exemplary single-wire bus apparatus configured according to an embodiment of the present disclosure to support more than four slave circuits per bus port based on a predefined response policy.

Before discussing a single-wire bus apparatus of the present disclosure, starting at FIG. 2, a brief overview of a conventional single-wire bus (SuBUS) apparatus is first provided with reference to FIGS. 1A-1C to help understand basic operations as well as limitations of the conventional SuBUS apparatus.

In this regard, FIG. 1A is a schematic diagram of an exemplary conventional SuBUS apparatus 10 in which a master circuit 12 is configured to communicate with a number of slave circuits 14(1)-14(M) over a SuBUS 16 coupled to a bus port 18. The master circuit 12 is configured to always initiate a SuBUS telegram communication over the SuBUS 16 by communicating a SuBUS telegram(s) to one or more of the slave circuits 14(1)-14(M). As such, the conventional SuBUS apparatus 10 is also known as a "master-slave bus architecture." The slave circuits 14(1)-14(M) may provide a data payload(s) to the master circuit 12 over the SuBUS 16 in response to receiving the SuBUS telegram(s) from the master circuit 12. Hereinafter, when the master circuit 12 and the slave circuits 14(1)-14(M) are communicating the SuBUS telegram(s) and/or the data payload(s) over the SuBUS 16, the master circuit 12 and the slave circuits 14(1)-14(M) are said to be in a bus communication mode.

FIG. 1B is a schematic diagram providing an exemplary illustration of one or more SuBUS telegrams 20, 22 communicated over the SuBUS 16 of FIG. 1A. Each of the SuBUS telegrams 20, 22 includes a start of sequence (SOS) sequence 24 and a SuBUS command sequence 26. The SuBUS command sequence 26 may correspond to a predefined SuBUS operation (e.g., register-read or register-write). The SOS sequence 24 always precedes the SuBUS command sequence 26 and is always communicated from the master circuit 12 to the slave circuits 14(1)-14(M) in FIG. 1A.

The SuBUS telegram 22, which succeeds the SuBUS telegram 20, may be separated from the SuBUS telegram 20 by a fast-charge period 28 that starts at time $T_1$ and ends at time $T_2$ ($T_2$>$T_1$) and an idle period 30 that starts at time $T_2$ and ends at time $T_3$ ($T_3$>$T_2$). The fast-charge period 28 is configured to allow each of the slave circuits 14(1)-14(M) to draw a higher charging current via the SuBUS 16 and carry out a defined slave operation. In this regard, the SuBUS 16 is said to be in a fast-charge state during the fast-charge period 28. The idle period 30 may be a no-activity period in which the master circuit 12 and the slave circuits 14(1)-14(M) may be inactive to help conserve power. Accordingly, the SuBUS 16 is said to be in an idle state during the idle period 30. During the fast-charge period 28 and the idle period 30, the SuBUS 16 is maintained at a bus voltage that is greater than zero volts (0 V).

The master circuit 12 is configured to suspend the SuBUS telegram communication over the SuBUS 16 during the fast-charge period 28 and the idle period 30. Accordingly, the master circuit 12 and the slave circuits 14(1)-14(M) are configured to refrain from communicating SuBUS telegram(s) and data payload(s) from time $T_1$ to $T_3$. In this regard, the SuBUS 16 can be said to be in a suspension mode between time $T_1$ and $T_3$.

Each of the SuBUS telegrams 20, 22 includes a slave address field 32, a write data field 34, and four acknowledgement (ACK) symbols 36. The slave address field 32 can be used to address the slave circuits 14(1)-14(M). The write data field 34 can be used to carry data to be written to the slave circuits 14(1)-14(M). The ACK symbols 36 can be used by the slave circuits 14(1)-14(M) to acknowledge receipt of the data carried in the data field 34. Given that the ACK symbols 36 are communicated immediately before the fast-charge period 28, each of the slave circuits 14(1)-14(M) can determine a start of the fast-charge period 28 based on the ACK symbols 36 by counting the four ACK symbols 36.

Each of the slave circuits 14(1)-14(M) is uniquely identified by a respective unique slave identification (USID). As such, the SuBUS command sequence 26 in the SuBUS telegrams 20, 22 can be a unicast command sequence destined to any one of the slave circuits 14(1)-14(M) when the slave address field 32 contains the USID of the any one of the slave circuits 14(1)-14(M). The SuBUS command sequence 26 in the SuBUS telegrams 20, 22 can also be a multicast command sequence destined to a subset of the slave circuits 14(1)-14(M) when the slave address field 32 contains a group slave identification (GSID) corresponding to the subset of the slave circuits 14(1)-14(M). Furthermore, the SuBUS command sequence 26 in the SuBUS telegrams 20, 22 can be a broadcast command sequence destined to all of the slave circuits 14(1)-14(M) when the slave address field 32 contains a broadcast slave identification (BSID).

In the conventional SuBUS apparatus 10, each of the slave circuits 14(1)-14(M) is required to explicitly acknowledge the data received in the write data field 34 in one of the ACK symbols 36. Given that each SuBUS command sequence 26 only includes four ACK symbols 36, only four of the slave circuits 14(1)-14(M) can receive the SuBUS command sequence 26 encoded with GSID or BSID in the slave address field 32. To allow more than four of the slave circuits 14(1)-14(M) to receive the SuBUS command sequence 26 encoded with GSID or BSID, the conventional SuBUS apparatus 10 may be adapted to add more bus ports into the master circuit 12.

In this regard, FIG. 1C is a schematic diagram of the conventional SuBUS apparatus 10 of FIG. 1A adapted to include a multi-port master circuit 12A for communicating with the slave circuits 14(1)-14(M) over the SuBUS 16. Common elements between FIGS. 1A and 1C are shown therein with common element numbers and will not be re-described herein.

The multi-port master circuit 12A can be configured to include multiple bus ports 18A(1)-18A(X) coupled to the SuBUS 16. In this regard, the multi-port master circuit 12A may communicate each of the SuBUS telegrams 20, 22 concurrently to more than four of the slave circuits 14(1)-14(M) via the bus ports 18A(1)-18A(X). However, since each SuBUS command sequence 26 only includes four ACK symbols 36, each of the bus ports 18A(1)-18A(X) can only support no more than four of the slave circuits 14(1)-14(M). As such, it is desirable to further enhance the conventional SuBUS apparatus 10 to support more than four of the slave circuits 14(1)-14(M) on any of the bus ports 18A(1)-18A(X).

In this regard, FIG. 2 is a schematic diagram of an exemplary single-wire bus apparatus 38 configured according to an embodiment of the present disclosure to support more than four slave circuits per bus port based on a predefined response policy.

The single-wire bus apparatus 38 includes a bridge circuit 40, which may be functionally equivalent to the master circuit 12 in FIG. 1A. The bridge circuit 40 includes at least one first bus port 42 that is coupled to a single-wire bus 44, which includes only a single wire. The bridge circuit 40 may include at least one second bus port 46 that is also coupled to the same single-wire bus 44.

The single-wire bus apparatus 38 includes a number of bus slave circuits 48(1)-48(L). Some of the bus slave circuits 48(1)-48(L) may be identical to the slave circuits 14(1)-14(M) in the conventional SuBUS apparatus 10 of FIG. 1A, which are required to acknowledge the SuBUS command sequence 26 in each of the SuBUS telegrams 20, 22 (also referred to as "legacy bus slave circuits" hereinafter). Some other of the bus slave circuits 48(1)-48(L) may be configured to optionally acknowledge the SuBUS command sequence 26 in each of the SuBUS telegrams 20, 22 based on embodiments discussed herein (also referred to as "enhanced bus slave circuits" hereinafter).

In a non-limiting example, the first bus port 42 is coupled to a first subset of five or more bus slave circuits 48(1)-48(K) among the bus slave circuits 48(1)-48(L) (5≤K<L). The second bus port 46 may be coupled to a second subset of five or more bus slave circuits 48(K+1)-48(L) (K<L). Each of the first subset of five or more bus slave circuits 48(1)-48(K) and the second subset of bus slave circuits 48(K+1)-48(L) may include exclusively legacy bus slave circuits, exclusively enhanced bus slave circuits, or a mixture of legacy bus slave circuits and enhanced bus slave circuits.

It should be appreciated that it is not a requirement to couple five or more bus slave circuits to each of the first bus port 42 and the second bus port 46. For example, the first bus port 42 can be coupled to five or more bus slave circuits, while the second bus port 46 is coupled to less than five bus slave circuits. Further, it may also be possible to add additional bus ports in the bridge circuit 40. Nevertheless, it is not possible to include an infinite number of the bus slave circuits 48(1)-48(L) in the single-wire bus apparatus 38. In a non-limiting example, a total count of the bus slave circuits 48(1)-48(L) supported by the bridge circuit 40 is less than or equal to fourteen (L≤14).

The bus slave circuits 48(1)-48(L) each include a slave port 50 that is coupled to the single-wire bus 44. Each of the bus slave circuits 48(1)-48(L) also includes a controller 52, which can be a microcontroller or a microprocessor, as an example. The controller 52 in any of the bus slave circuits 48(1)-48(L) can be configured to receive a command sequence 54, which is identical to the SuBUS command sequence 26 in FIG. 1B, from the bridge circuit 40 via the slave port 50. In this regard, the command sequence 54 can be destined to any one of the bus slave circuits 48(1)-48(L) if the slave address field 32 includes a USID, or to any two or more of the bus slave circuits 48(1)-48(L) if the slave address field 32 includes a GSID, or to all of the bus slave circuits 48(1)-48(L) if the slave address field 32 includes a BSID.

Upon receiving the command sequence 54 that includes a GSID or a BSID in the slave address field 32, the controller 52 determines whether to respond to the received command sequence 54. In response to determining to respond to the received command sequence 54, the controller 52 will assert an acknowledgement signal 56 on the single-wire bus 44 in one of the ACK symbols 36 in FIG. 1B. Alternatively, if the controller 52 determines not to respond to the received command sequence 54, the controller 52 will not assert the acknowledgement signal 56 on the single-wire bus 44 in any of the ACK symbols 36. Should the controller 52 decides not to assert the acknowledgement signal 56 on the single-wire bus 44, the bridge circuit 40 may assert the acknowledgement signal 56 on the single-wire bus 44 in one of the ACK symbols 36 on behalf of the controller 52. In this regard, the bridge circuit 40 helps to make sure that the acknowledgement signal 56 is asserted in all four of the ACK symbols 36, thus making it possible for each of the bus slave circuits 48(1)-48(L) to determine the start of the fast-charge period 28 following each SuBUS telegrams 20, 22 in FIG. 2B.

The controller 52 in each of the bus slave circuits 48(1)-48(L) can be configured to determine whether to respond to the received command sequence 54 based on the predefined response policy. In a non-limiting example, each of the bus slave circuits 48(1)-48(L) can include a slave register 58 (denoted as "5-REGMAP") to store the predefined response policy, as illustrated in FIG. 3.

Figure 3:
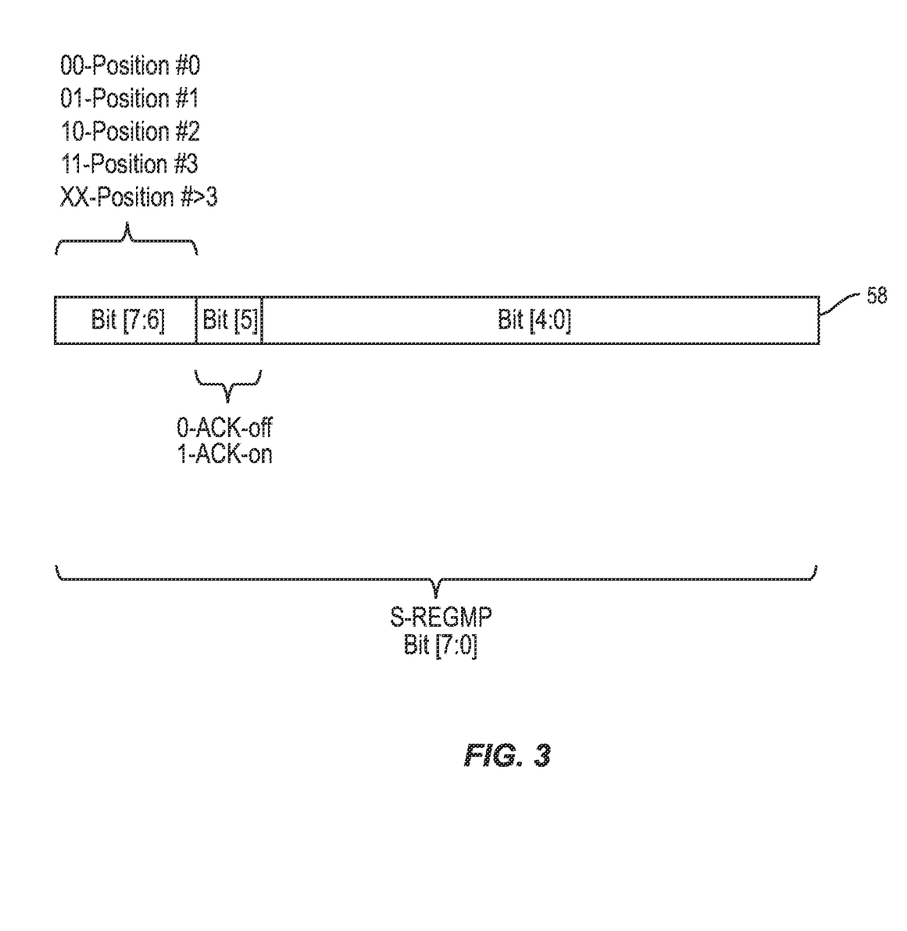
FIG. 3 is a block diagram providing an exemplary illustration of a slave register configured to store a predefined response policy.

FIG. 3 is a block diagram providing an exemplary illustration of the slave register 58 configured to store the predefined response policy. The slave register 58 may include eight bits (denoted as "bit [7:0]"). In a non-limiting example, bit [5] is configured to store the predefined response policy and bit [4:0] is reserved for other usage.

The predefined response policy can include a position indicator stored in bit [7:6] and a response indicator stored in bit [5]. The position indicator can be configured to indicate a preassigned position number of any of the bus slave circuits 48(1)-48(L). Specifically, the position indicator in bit [7:6] can have a value of 00, 01, 10, or 11, which identifies preassigned positions 0, 1, 2, or 3 and corresponds to the four ACK symbols 36 in each of the SuBUS telegrams 20, 22. The position indicator can also be undefined (denoted as "XX") for any preassigned position number that is greater than three (>3) (a.k.a. "threshold number"). The response indicator can have either 0 or 1. When the response indicator is set to 0 (a.k.a. ACK-off), the bus slave circuits 48(1)-48(L) will not assert the acknowledgement signal 56 in response to receiving the command sequence 54. In contrast, when the response indicator is set to 1 (a.k.a. ACK-on), the bus slave circuits 48(1)-48(L) will assert the acknowledgement signal 56 in response to receiving the command sequence 54.

With reference back to FIG. 2, the legacy bus slave circuits among the bus slave circuits 48(1)-48(L) may not recognize and therefore can ignore the predefined response policy. In contrast, the enhanced bus slave circuits among the bus slave circuits 48(1)-48(L) are required to be obeyed by the predefined response policy. As such, the single-wire bus apparatus 38 can be configured to include a mixture of the legacy and enhanced bus slave circuits among the bus slave circuits 48(1)-48(L) for backward compatibility reasons. To enable such backward compatibility, the legacy and the enhanced bus slave circuits must operate based on some ground rules as established in Table 1 below.

TABLE 1

| Type | Position Indicator Bit [7:6] | Response Indicator Bit [5] | Operation Rules |
|---|---|---|---|
| Legacy Slave Circuit | 00, 01, 10, 11 | — | ACK always ON |
| Enhanced Slave Circuit | 00, 01, 10, 11 | 0 | ACK OFF |
| | | 1 | ACK ON |
| | XX | — | ACK always OFF |

For legacy bus slave circuits, the position indicator in bit [7:6] can only be set to 00, 01, 10, 11, which corresponds to position numbers 0, 1, 2, and 3, respectively. Accordingly, the legacy bus slave circuits are required to always assert the acknowledgement signal 56 (a.k.a. "ACK always ON"), independent of the value of the response indicator in bit [5]. Notably, the position indicator in bit [7:6] cannot be left undefined for the legacy bus slave circuits.

For enhanced bus slave circuits, when the position indicator in bit [7:6] is set to 00, 01, 10, or 11, the enhanced bus slave circuits will operate based on the response indicator in bit [5]. Specifically, the enhanced bus slave circuits are required to assert the acknowledgement signal 56 (a.k.a. "ACK ON") when the response indicator is set to 1 (ACK-on) and not to assert the acknowledgement signal 56 (a.k.a. "ACK OFF") when the response indicator is set to 0 (ACK-off). In case the response indicator is set to 0 (ACK-off), the bridge circuit 40 will assert the acknowledgement signal 56 on behalf of the enhanced bus slave circuits.

When the position indicator in bit [7:6] is undefined, which indicates a position number greater than 3, the enhanced bus slave circuits are required not to assert the acknowledgement signal 56 (a.k.a., "ACK always OFF"). In the meantime, the bridge circuit 40 will not assert the acknowledgement signal 56 on behalf of the enhanced bus slave circuits.

By configurating the bus slave circuits 48(1)-48(L) to operate based on the ground rules established in Table 1, it is possible to couple more than 4 slave circuits to each of the first bus port 42 and the second bus port 46. As a result, it is possible to improve design and implementation flexibility of the single-wire bus apparatus 38.

Figure 4:
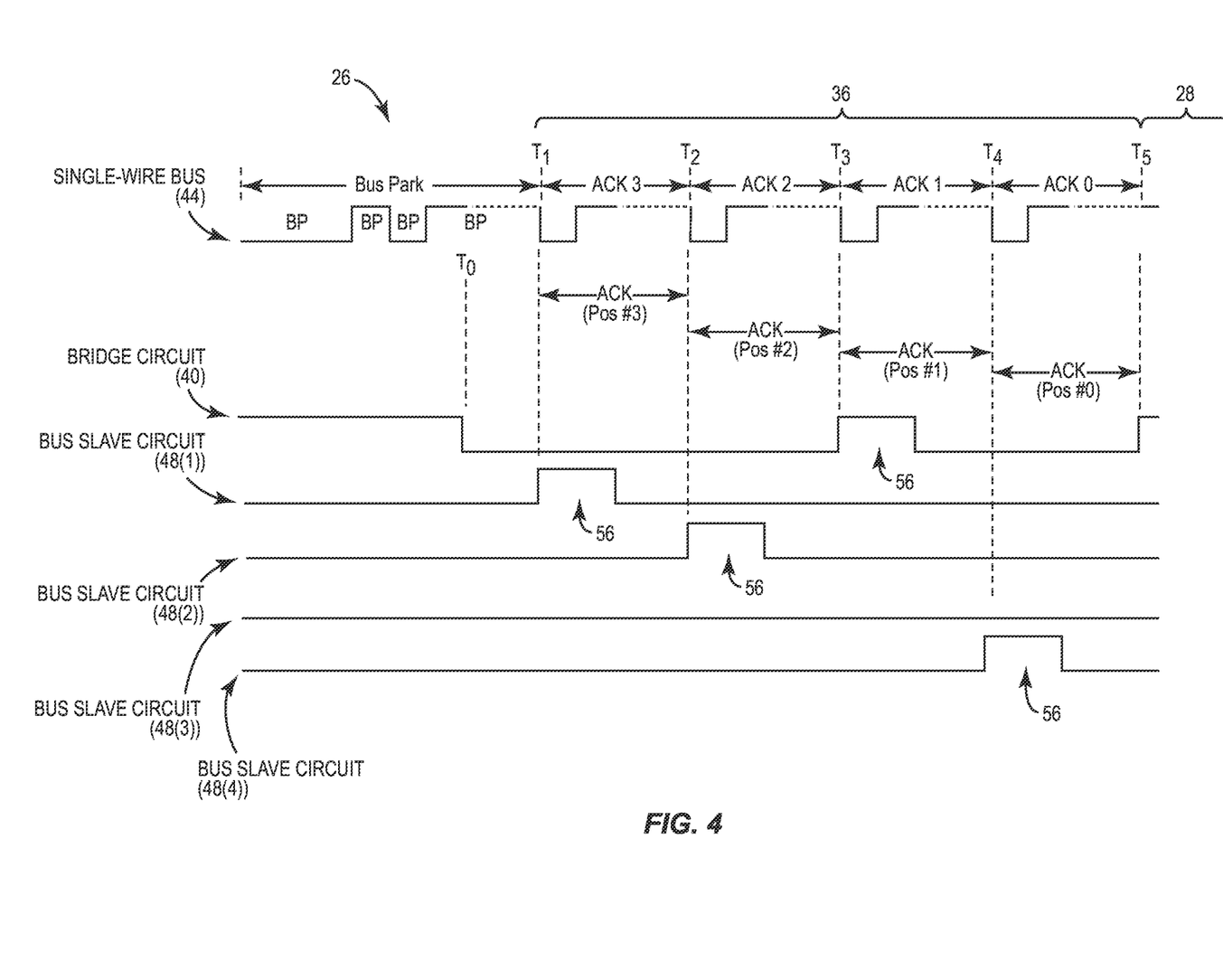
FIG. 4 is a signal flow diagram illustrating exemplary operations of the single-wire bus apparatus of FIG. 2 in accordance to the predefined response policy.

FIG. 4 is a signal flow diagram illustrating exemplary operations of the single-wire bus apparatus 38 of FIG. 2 in accordance to the predefined response policy as established in Table 1. Elements in FIGS. 1B and 2 are referenced in conjunction with FIG. 4 and will not be re-described herein.

In a non-limiting example, the bus slave circuits 48(1)-48(4) are preassigned with position numbers 3, 2, 1, and 0 (corresponding to position indicator values 11, 10, 01, and 00), respectively. Prior to time $T_0$, the bridge circuit 40 has communicated a data in the write data field 34 with a GSID or a BSID in the slave address field 32. At time T0, the bridge circuit 40 enables output on the single-wire bus 44 such that the bus slave circuits 48(1)-48(4) can acknowledge the data carried in the write data field 34. In a non-limiting example, the bus slave circuits 48(1)-48(4) are so arranged to assert the acknowledgement signal 56 based on the predefined response policy in Table 1 in a first ACK symbol 36 (denoted as "ACK 3"), a second ACK symbol 36 (denoted as "ACK 2"), a third ACK symbol 36 (denoted as "ACK 1"), and a fourth ACK symbol (denoted as "ACK 0"), respectively. In this example, the response indicators in Table 1 are set to 1, 1, 0, and 1 for bus slave circuits 48(1), 48(2), 48(3), and 48(4), respectively.

At time $T_1$, which indicates a start of the first ACK symbol 36, the bus slave circuit 48(1) asserts the acknowledgement signal 56 based on the response indicator value "1" in Table 1. At time $T_2$, which indicates a start of the second ACK symbol 36, the bus slave circuit 48(3) asserts the acknowledgement signal 56 based on the response indicator value "1" in Table 1. At time $T_3$, which indicates a start of the third ACK symbol 36, the bus slave circuit 48(3) does not assert the acknowledgement signal 56 based on the response indicator value "0" in Table 1. As such, the bridge circuit 40 asserts the acknowledgement signal 56 on behalf of the bus slave circuit 48(3). At time $T_4$, which indicates a start of the fourth ACK symbol 36, the bus slave circuit 48(4) asserts the acknowledgement signal 56 based on the response indicator value "1" in Table 1. By asserting the acknowledgement signal 56 during each of the first, second, third, and fourth ACK symbols 36, all of the bus slave circuits 48(1)-48(4) are able to accurately determine the start time $T_5$ of the fast-charge period 28.

With reference back to FIG. 2, the ground rules as established in Table 1 are only applicable when the slave address field 32 in the SuBUS command sequence 26 is set to either a GSID or a BSID. In case the slave address field 32 is set to a USID, all of the bus slave circuits 48(1)-48(L) are required to assert the acknowledgement signal 56 independent of the predefined response policy.

The bridge circuit 40 can include a control circuit 60, which can be a field-programmable gate array (FPGA), for example. The bridge circuit 40 can also include a master register circuit 62 (denoted as "M-REGMAP"). In a non-limiting example, the master register circuit 62 can include a number of registers, such as the slave register 58 in each of the bus slave circuits 48(1)-48(L). The master register circuit 62 may be configured to store the predefined response policy associated with each of the bus slave circuits 48(1)-48(L).

The bridge circuit 40 may be coupled to a radio frequency front-end (RFFE) master circuit 64 via an RFFE bus 66. The bridge circuit 40 may be configured to operate as a slave to the RFFE master circuit 64 to bridge communications between the RFFE master circuit 64 and any of the bus slave circuits 48(1)-48(L).

Those skilled in the art will recognize improvements and modifications to the embodiments of the present disclosure. All such improvements and modifications are considered within the scope of the concepts disclosed herein and the claims that follow.

What is claimed is:

1. A bus slave circuit comprising:
  a slave port coupled to a single-wire bus; and
  a controller configured to:
    receive a command sequence via the slave port;
    determine whether the received command sequence is one of a multicast command sequence comprising a group slave identification (GSID) and a broadcast command sequence comprising a broadcast slave identification (BSID); and
    in response to determining that the received command sequence is one of the multicast command sequence and the broadcast command sequence:
      determine whether to respond to the received command sequence based on a predefined response policy; and
      assert an acknowledgement signal on the single-wire bus in response to determining to respond to the received command sequence.

2. The bus slave circuit of claim 1 wherein the controller is further configured not to assert the acknowledgement signal on the single-wire bus in response to determining not to respond to the received command sequence.

3. The bus slave circuit of claim 1 further comprising a slave register configured to store the predefined response policy, wherein the predefined response policy comprises:
  a position indicator configured to indicate a preassigned position number of the bus slave circuit; and
  a response indicator configured to indicate whether the bus slave circuit will respond to the received command sequence.

4. The bus slave circuit of claim 3 wherein the controller is provided in a legacy bus slave circuit and further configured to determine to respond to the received command sequence when the preassigned position number is smaller than or equal to a threshold number, independent of the response indicator.

5. The bus slave circuit of claim 3 wherein the controller is provided in an enhanced bus slave circuit and further configured to:
  determine to respond to the received command sequence when the preassigned position number is smaller than or equal to a threshold number and the response indicator is set to TRUE; and
  determine not to respond to the received command sequence under one of following conditions:
    the preassigned position number is smaller than or equal to the threshold number and the response indicator is set to FALSE; and
    the preassigned position number is greater than the threshold number.

6. The bus slave circuit of claim 1 wherein the controller is further configured to:
  determine that the command sequence is a unicast command sequence associated with a unique slave identification (USID); and
  assert the acknowledgement signal on the single-wire bus in response to receiving the unicast command sequence and independent of the predefined response policy.

7. A single-wire bus apparatus comprising:
  a single-wire bus consisting of one wire; and
  a plurality of bus slave circuits each comprising:
    a slave port coupled to the single-wire bus; and
    a controller configured to:
      receive a command sequence via the slave port;
      determine whether the received command sequence is one of a multicast command sequence comprising a group slave identification (GSID) and a broadcast command sequence comprising a broadcast slave identification (BSID); and
      in response to determining that the received command sequence is one of the multicast command sequence and the broadcast command sequence:
        determine whether to respond to the received command sequence based on a predefined response policy; and
        assert an acknowledgement signal in response to determining to respond to the received command sequence.

8. The single-wire bus apparatus of claim 7 further comprising a bridge circuit coupled to the plurality of bus slave circuits via the single-wire bus and configured to communicate the command sequence to any one or more of the plurality of bus slave circuits via the single-wire bus.

9. The single-wire bus apparatus of claim 8 wherein the bridge circuit is further coupled to a radio frequency front-end (RFFE) master circuit via an RFFE bus, the bridge circuit is configured to bridge communications between the RFFE master circuit and any one or more of the plurality of bus slave circuits.

10. The single-wire bus apparatus of claim 8 wherein the bridge circuit comprises:
  at least one first bus port coupled to a first subset of five or more of the plurality of bus slave circuits; and
  at least one second bus port coupled to a second subset of five or more of the plurality of bus slave circuits different from the first subset of five or more of the plurality of bus slave circuits.

11. The single-wire bus apparatus of claim 8 wherein the bridge circuit is configured to communicate the command sequence as one of:

the multicast command sequence associated with the GSID identifying any two or more of the plurality of bus slave circuits; and the broadcast command sequence associated with the BSID identifying the plurality of bus slave circuits.

12. The single-wire bus apparatus of claim 11 wherein the controller is further configured not to assert the acknowledgement signal on the single-wire bus in response to determining not to respond to the received command sequence.

13. The single-wire bus apparatus of claim 12 wherein the bridge circuit is further configured to assert the acknowledgement signal on the single-wire bus on behalf of any of the plurality of bus slave circuits that determines not to respond to the received command sequence.

14. The single-wire bus apparatus of claim 11 wherein each of the plurality of bus slave circuits further comprises a slave register configured to store the predefined response policy, wherein the predefined response policy comprises:
   a position indicator configured to indicate a preassigned position number of any of the plurality of bus slave circuits; and
   a response indicator configured to indicate whether the any of the plurality of bus slave circuits will respond to the received command sequence.

15. The single-wire bus apparatus of claim 14 wherein the controller is provided in a legacy bus slave circuit and further configured to determine to respond to the received command sequence when the preassigned position number is smaller than or equal to a threshold number, independent of the response indicator.

16. The single-wire bus apparatus of claim 14 wherein the controller is provided in an enhanced bus slave circuit and further configured to:
   determine to respond to the received command sequence when the preassigned position number is smaller than or equal to a threshold number and the response indicator is set to TRUE; and
   determine not to respond to the received command sequence under one of following conditions:
      the preassigned position number is smaller than or equal to the threshold number and the response indicator is set to FALSE; and
      the preassigned position number is greater than the threshold number.

17. The single-wire bus apparatus of claim 14 wherein the bridge circuit comprises a master register circuit configured to store the predefined response policy associated with each of the plurality of bus slave circuits.

18. The single-wire bus apparatus of claim 8 wherein:
   the bridge circuit is further configured to communicate the command sequence comprising a unicast command sequence associated with a unique slave identification (USID) to any one of the plurality of bus slave circuits; and
   the controller is further configured to assert the acknowledgement signal on the single-wire bus in response to receiving the unicast command sequence and independent of the predefined response policy.

19. The single-wire bus apparatus of claim 7 wherein a total count of the plurality of bus slave circuits is less than or equal to fourteen.

* * * * *